United States Patent [19]

Bujese

[11] Patent Number: 4,797,714

[45] Date of Patent: Jan. 10, 1989

[54] MASTER AND MASTER TRANSPORT ASSEMBLY REGISTRATION SYSTEM

[75] Inventor: David P. Bujese, Butler, N.J.

[73] Assignee: Olin Hunt Specialty Products, Inc., Palisades Park, N.J.

[21] Appl. No.: 141,564

[22] Filed: Jan. 7, 1988

[51] Int. Cl.[4] .............................................. G03B 27/32

[52] U.S. Cl. ........................................ 355/77; 355/91; 355/78

[58] Field of Search ........................ 355/91, 77, 78, 79

[56] References Cited

U.S. PATENT DOCUMENTS

| | | | |
|---|---|---|---|
| 3,744,891 | 7/1973 | Dennis et al. | 353/27 |
| 3,768,904 | 10/1973 | Rodek | 355/40 |
| 3,900,257 | 8/1975 | Woolley, Jr. et al. | 355/29 |
| 4,474,465 | 10/1984 | Amendola et al. | 355/78 |
| 4,636,067 | 1/1987 | Richards, Sr. | 355/91 |

*Primary Examiner*—Monroe H. Hayes

*Attorney, Agent, or Firm*—Ralph D'Alessandro

[57] ABSTRACT

A method and apparatus are provided for precisely registering a flexible web to a stationary rigid support station to accurately and repeatably electrostatically transfer a developed image from a master on the flexible web to a receiving surface on the rigid support station.

28 Claims, 6 Drawing Sheets

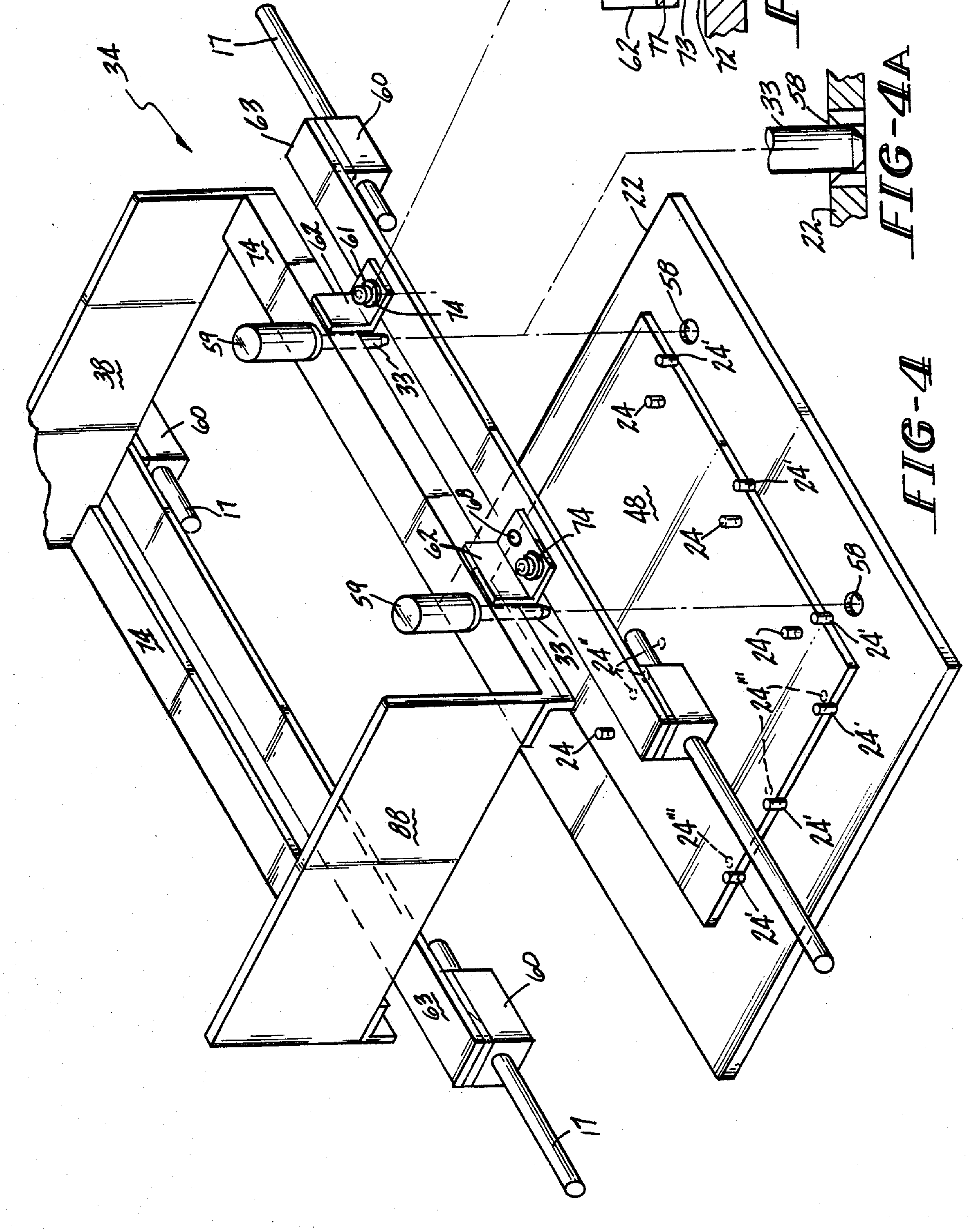
FIG-4
FIG-4A
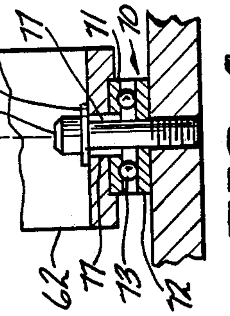
FIG-4B

MASTER AND MASTER TRANSPORT ASSEMBLY REGISTRATION SYSTEM

BACKGROUND OF THE INVENTION

This invention relates generally to the method and apparatus for the electrostatic transfer of the developed image from a master to a receiving surface. More specifically, it pertains to the registration of the master and the master transport assembly with the receiving surface to achieve accuracy of the transferred image and repeatability of the process.

In industrial processes utilizing the transfer of a desired image from a master to a receiving surface, there is a need to have a functional system which ensures the accurate transfer of the image from the master to the receiving surface. The transfer process must be repeatable, so that the transferred image is transferred to the same location on each receiving surface. The degree of precision can vary whether the application for the transfer from the master to the receiving surface is color printing, photographic printing, film strip printing, or printed circuit printing onto flexible or rigid receiving surfaces. Although the manufacturer of printed circuits can require more precise transfer because of the increasing density and finer lines and line-spacings being employed, the registration system must be accurate for all applications.

Where the registration system is employed in graphic arts applications transferring multiple colors, successes and treatments to the same receiving surface to obtain a 2, 3, or 4 color copy, the registration system must provide an accurate and repeatable transfer. Similarly, where printed circuits are to be produced, the increasing use of two side circuit boards requires that the images be aligned on both sides of the boards to precise tolerances.

Previous registration systems have employed the use of registration pins to engage perforations in a receiving flexible web, transfer prerecorded information from one roller wound flexible web to a second roller round flexible web with preprinted information already thereon by controlling the velocities of the two webs, utilized a rigid table with a transparency thereon to repeatedly position the transparency over a receiving location through the use of horizontally acting solenoid pins, and a pin alignment system with floating pins for use in the photographic printing to allow the pins to float in holes on the pin board on which serves as a flat support for a mask/film sandwich.

None of the prior systems have required the precise tranfer of the image from a master to a receiving surface where the master is carried on a flexible web that is kept in tension. Prior systems fail to minimize the number of dimensions and fits that must be actually held in order to produce the final result with the fine tolerances apparently required.

These problems are solved in the method and design of the present apparatus and permits a master transport assembly to be precisely aligned with a stationary receiving surface to achieve accurate and reapeatable image transfer.

SUMMARY OF THE INVENTION

It is an object of the present invention to provide a registration system that can be used for color to color and printed circuit transfers from a flexible web to a stationary receiving surface.

It is another object of the present invention to provide a registration system that will acccurately and reapeatably transfer the desired image on the master to the receiving surfaces.

It is a feature of the present invention that the master is located on the flexible web by the same apparatus used to locate the receiving surface on the supporting platen.

It is another feature of the present invention that the master is located on the support platen in the same location that the receiving surfaces are positioned and then electrostatically transferred to its flexible area web.

It is still another feature of the present invention that a registration system can be adjusted to compensate for tolerances in the master transport assembly utilized to position the carrier web.

It is yet another feature of the present invention that the master is registered on the support platen by the same pins that are used to register the receiving surface and both the master and the receiving surface are held in place by a vacuum system until the master is transferred to the supporting carrier web and the image is transferred to the receiving surface, respectively.

It is an advantage of the present invention that the registration system and method may be used for color printing registration, color proofing or circuit board printing.

It is another advantage of the present invention that the invention provides an automated registration system.

It is still another advantage of the present invention that there is no need to adjust the position of the master on the flexible carrier web or the receiving surface on the support platen during operation.

It is still another feature of the present invention that a method and apparatus are provided that permits front and back registration for two sided circuit boards.

These and other features, objects and advantages are obtained by the use of the method and apparatus to precisely align a master transport assembly that carries the master on a tensioned, flexible web to a stationary receiving surface to achieve accurate and repeatable image transfer.

BRIEF DESCRIPTION OF THE DRAWINGS

The objects, features and advantages of the present invention become apparent upon consideration of the following detailed disclosure of the invention, especially when it is taken in conjunction with the accompanying drawings

FIG. 4 is an exploded diagrammatic view showing the master transport assembly minus the flexible carrier web as it aligns with the support platen which is used to support both the master and the receiving surface;

FIG. 4A is an enlarged partial view of the master transport as alignment pin inserted into the pin receptacle support platen;

FIG. 4B enlarged partial view of the thrust bearing used to precisely align the master transport assembly to the platen;

DETAILED DESCRIPTION OF THE PREFERRED EMBODIMENT

Figure 1:
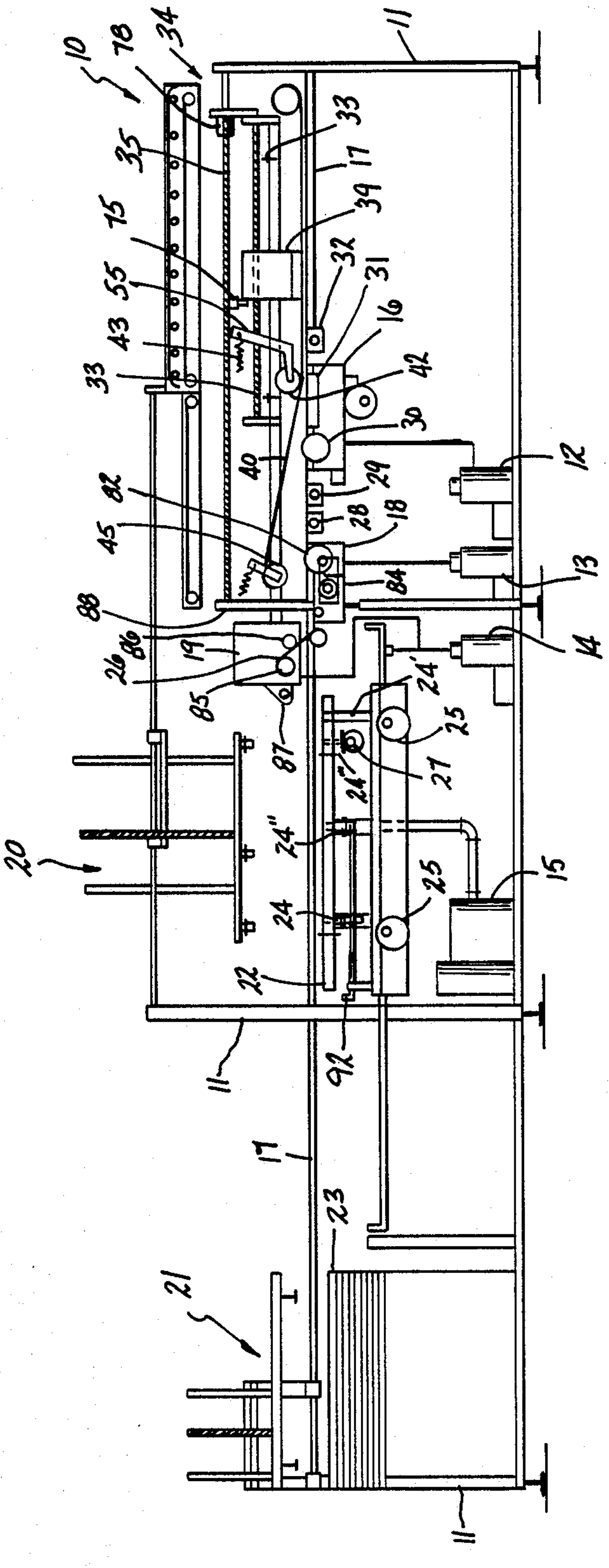
FIG. 1 is a side elevational diagrammatic illustration of the apparatus for transferring an electrostatically developed image from a master to a receiving surface.

FIG. 1 shows a side elevational diagrammatic illustration of the electrostatic imaging apparatus, indicated generally by the numeral 10. Apparatus 10 has a support frame 11, to which are mounted toner tank assembly 12, cleaning station tank and feed line assembly 13, non-polar insulating solvent tank assembly 14, and vacuum pump assembly 15. Each of the tank assemblies 12, 13 and 14 have appropriate hoses and pumps to either distribute the toner to the toning or development station 16 or the non-polar insulating solvent to the master cleaning station 18 and wicking station 19, respectively. Apparatus 10 at the infeed end has a board feeder unit 21 which picks up individual receiving surfaces 23, such as copper boards or non-conductive materials depending upon the application, by appropriate means, such as suction or vacuum pickup, and transports it along guide rails 17 to a board receiving station or stationary platen 22, where it is correctly positioned by alignment pins 24. After image transfer to the receiving surface 23 has been completed, a board pickup unit 20 removes the imaged receiving surface 23 from the platen 22 in preparation for receipt of the next receiving surface 23 for imaging.

A permanent master is used to produce the desired image on each copper board or receiving surface 23. The permanent master is a multiple layered structure having a base layer of a suitable flexible and non-conductive plastic, such as a polyethylene terephthalate sold under the tradename Mylar®, which is coated with an aluminum layer and a layer of photosensitive material, such as dry film photoresist or liquid photoresist. The permanent master is produced by exposing the desired pattern, such as through a mask, to actinic radiation. The exposed pattern on the electrostatically imageable surface of the master, once thus cross-linked, creates a permanent latent image with permanently increased electrical resistivity. This latent image will hold an electrostatic charge when exposed to a charging apparatus, such as corona 32. The charged latent image attracts the toner particles of an appropriate toner when the master 48, with the image thereon, is passed through toning station 16.

Figure 2:
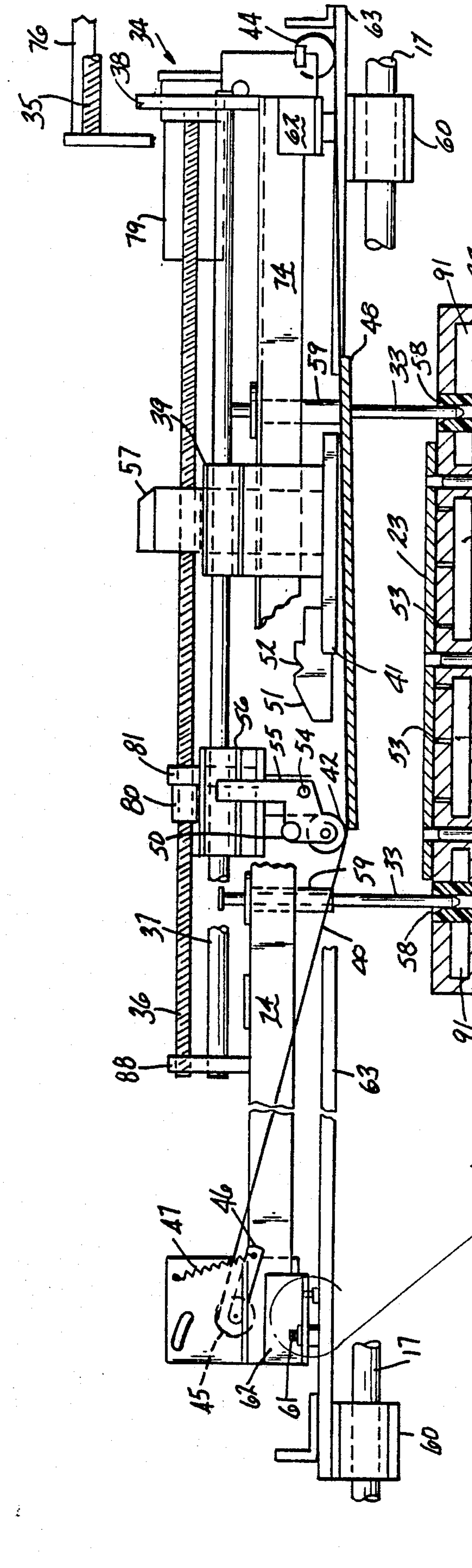
FIG. 2 is a partial side elevational view of a master transport assembly and the alignment means positioning the master, transport assembly and the master over the support plates and the receiving surface.
Figure 2A:
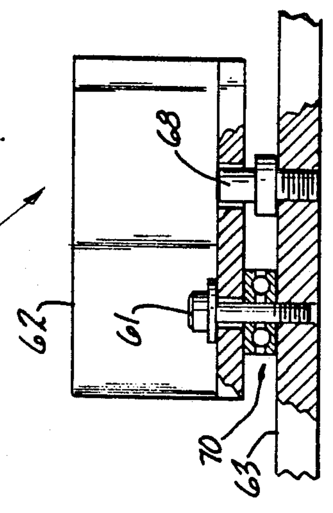
FIG. 2A is an enlarged partial side view of the thrust bearing and the stabilizing pin used to ensure alignment of the master transport assembly and its carrier web to support platen.

The master, seen as 48 in FIG. 2, is placed on a stationary platen 22 of FIG. 1 with the photosensitive surface down prior to the picking up of any of the conductive receiving surfaces 23. Previously an alignment template (not shown) has been used to adjust all of the alignment pins 24, 24', 24", and 24''' to fit within the holes in the heavy metal template that is placed over the raised pins on the platen 22. The position of alignment pins 24, 24', 24", and 24''' may be adjusted by means of adjustment screws (not shown) beneath platen 22. Once proper adjustment has been achieved, the template is removed and the master registration process begins.

Figure 5:
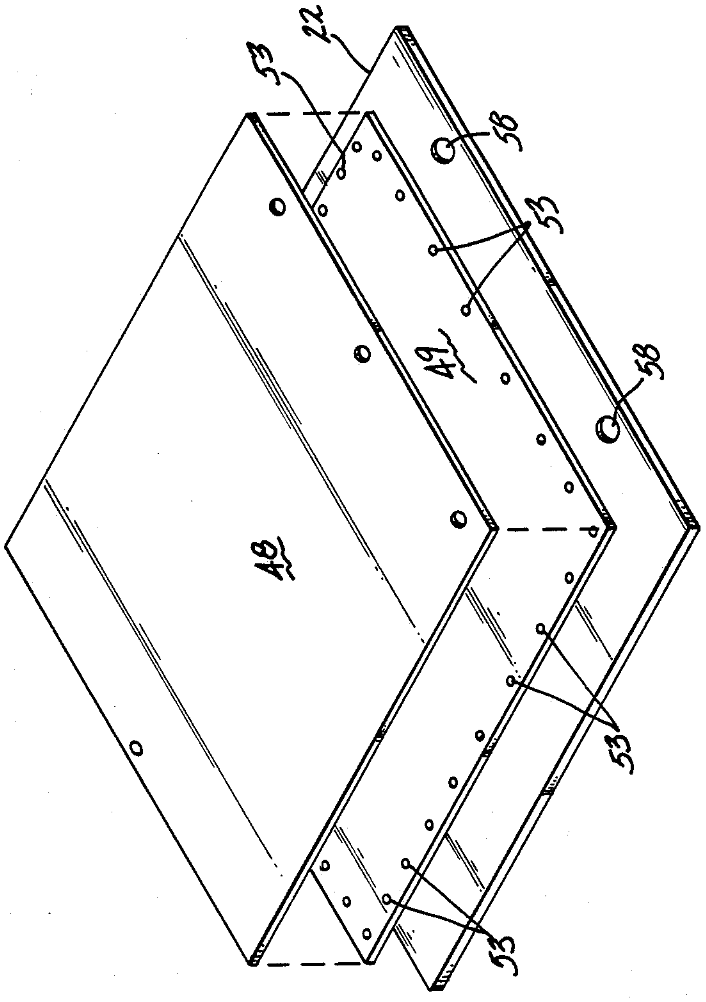
FIG. 5 is a front perspective view of the support platen, the dummy receiving surface and the master as they are employed to precisely align the master with the receiving surface on the support platen.

FIG. 5 shows the sequence which is followed to register the master 48 on the platen 22. First a dummy receiving surface or punch guide 49 is placed on the platen 22. Surface 49 is of the same thickness as the receiving surfaces 23 which will be employed during the actual image transfer process. The dummy receiving surface 49 has a plurality of vacuum holes 53 about its perimeter. The permanent master 48 has previously had its photosensitive surface exposed to obtain the difference in electrical resistivity required for the process by the cross-linking of the exposed surface area to obtain the permanent latent image desired. This cross-linked exposed surface area has increased electrical resistivity. Alignment pins 24 are then raised to register the master 48 and the dummy receiving surface 49 to the platen 22. Alignment pins 24 register the master 48 to the platen through an adaptation of the standard four (04) slot system. This adaptation results in a "T" design that utilizes 3 slots and the corresponding pins 24, along one edge and a single slot and pin 24 at the base of the "T" as seen in FIG. 4. This permits two sides of a receiving surface 23 to be precisely imaged, such as with dual sided circuit boards, even when two different masters are used and to permit variable width receiving surfaces 23 to be used. This "T" design pin arrangement simplifies the registration system.

As seen in FIG. 4, alignment pins 24, 24' 24" and 24''' comprise four sets which may be selected by cam control rods 92, only one of which is shown in FIG. 1, depending on the size of the surface to be registered. The alignment pins 24 are used to register the 24"×30" long master 48 is always the same size to ensure that the full width of the carrier web means 40 is convered to prevent the buildup of contaminants between the master 48 and the carrier web means 40. By selection of the appropriate alignment pins 24, 24', 24" and 24''' receiving surfaces of a width of 12 inches, 16 inches, 18 inches or 24 inches, for example, may be selected and registered on the platen 22 for either 18 or 24 inch length boards. Alignment pins 24 and 24' are always actuated regardless of the size of the receiving surface. Once properly registered by having the pins position and retain the master 48 and the dummy receiving surface 49 in position, the vacuum pump apparatus 15 is activated to hold both the dummy receiving surface 49 and the master 48 in place. Perimeter vacuum holes 53 permit the suction to retain the master 48 in its proper position through the dummy receiving surface 49. Platen 22 has a plurality of holes (not shown) which permits the vacuum pump assembly 15 to suction out the air into the platen vacuum chambers 41 of FIG. 2 from beneath the dummy surface that the master 48 is properly positioned on the stationary platen 22 via the use of pin contact plate cams 25, dielectric cam contact blocks 90 and pin contact plate 66, best seen in FIGS. 2 and 6, or other appropriate apparatus.

Figure 6:
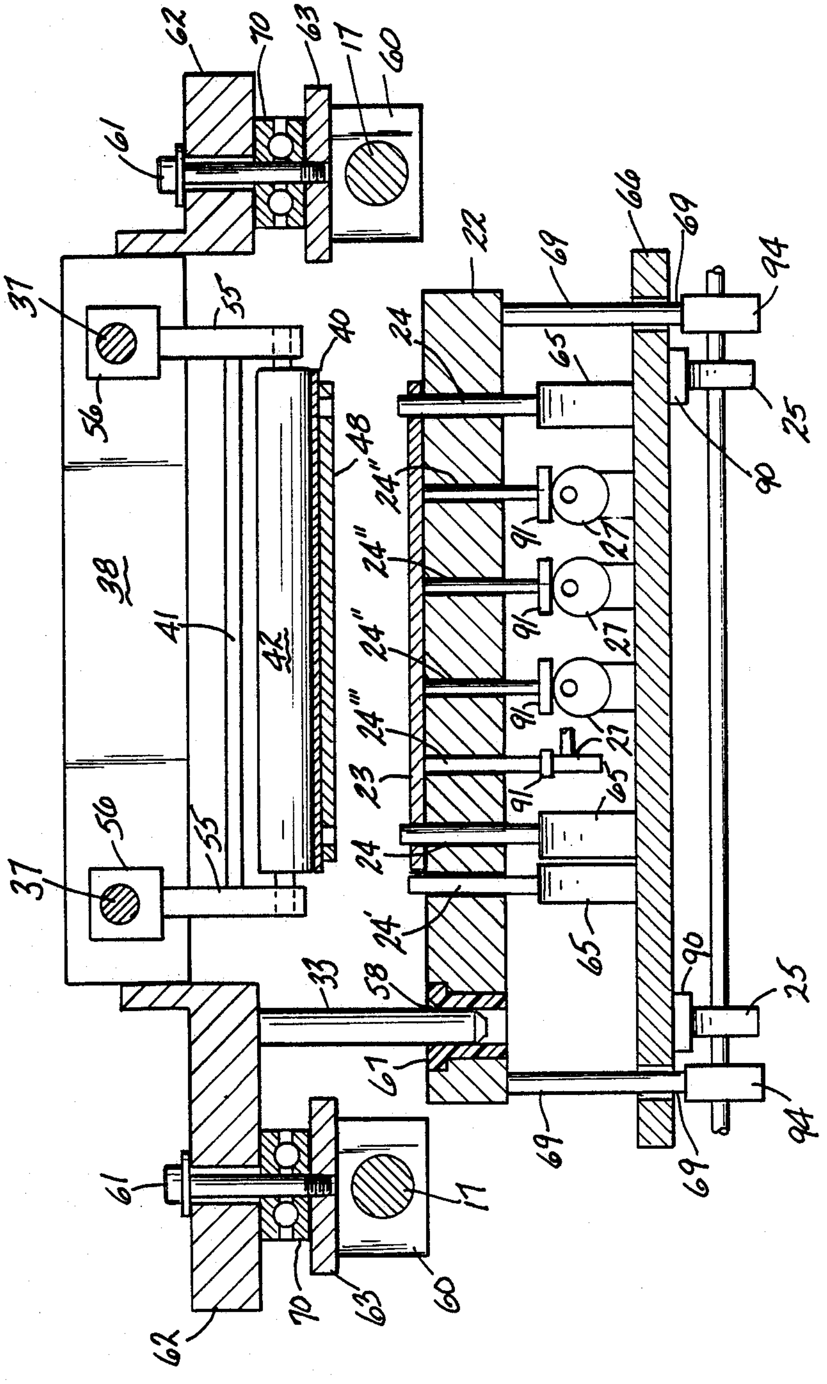
FIG. 6 is a partial front elevational view showing the master transport assembly and the alignment means positioning the master transport assembly and the master over the support platen and the receiving surface.

FIG. 6 shows how the pin contact plate 66 is raised by the contact of pin contact plate cams 25 against cam contact blocks 90. This in turn raises alignment pins 24 by the contact with pin receptacles 65. The action of pin cams 27, driven by a drive motor, chain and sprocket assembly (all not shown) is as shown in FIG. 6 wherein eccentric cams 27 raise up against cam blocks 91 to raise the desired one of alignment pins 24″, depending upon the width of the receiving surface 23.

The master 48 is then picked up by the flexible carrier web means 40 by having the master transport assembly, indicated generally by the numeral 34, move over the platen 22. Master transport assembly 34 is being driven along guide rails 17 by the main drive screw shaft 35 of FIGS. 1 and 2. The master transport assembly 34 is aligned and registered to the master 48 and platen 22 by the engagement of alignment pins 33 (see FIGS. 1-4 and 6) on the transport assembly 34 with the pin receptacles 58 (FIGS. 2 and 6), as will be explained in greater detail hereafter. Alignment pins 33 are raised or lowered by air cylinders 59. As seen in FIGS. 2, 4 and 6, transport assembly 34 travels along guide rails 17 via transport assembly bearings 60. Bearings 60 are connected by support brackets 62 and an appropriate fastener 61, such as a bolt or pin, to transport assembly support members 63.

Master transport assembly alignment pins 33 register the transport assembly 34 with its flexible web 40 to the platen 22 so there is no play through the use of thrust bearings 70 (only one of which is shown in FIG. 4B) connecting the transport assembly support member or rail 63 and the transport assembly support brackets 62, which are appropriately fastened to transport assembly carriage rail 74. Thrust bearings 70 comprise a top floating washer 71, a bottom stationary washer 72 and thrust ball bearings 73. A top washer 74 fits about the fastener 61. As can be seen in the enlargement, a gap 77 of approximately 1/32″ is provided between the outer diameter of the fastener 61 and the floating washer 71 and brackets 62.

Alignment pins 33 then drop down into the pin receptacles 58 in the platen 22 when the transport assembly 34 with the carrier web 40 is properly positioned over the platen 22. Receptacles 58 have their upper sides tapered, as can be best seen in the enlarged partial view in FIG. 4A, to permit the pins to compensate for any slight misalignment. A direct voltage is applied to the carrier web 40 through the web retention roller 44 or the web tensioning roller 45. Which ever roller does not have the voltage source attached thereto serves as the ground roller.

The electrical charge is supplied to the carrier web means 40, which is formed from a flexible, non-conductive material having a conductive coating on the side in contact with the master 48. Silver coated Mylar(R) plastic has been successfully employed. The electrical charge is carried by the conductive coating and creates the electrostatic force which is sufficient to overcome the vacuum and pick up and hold the master 48 on the carrier web means 40. The master 48 is picked up by the carrier web means 40 when the web means 40 is brought into contact with master 48 at discrete points as the transfer roller 42 traverses along the top surface of the carrier web means 40. After the transfer roller 42 has completed its traverse, the master transport assembly 34, with the master 48 held in place on the carrier web means 40, as seen in FIG. 2, then returns to the start position shown in FIG. 1.

Since the master transport assembly 34 and its carrier web means 40 were registered to the platen 22 via the alignment pins 33 and the master 48 was registered to the platen 22 via the pins 24, the master 48 is now registered to the master transport assembly 34 and its carrier web means 40. The dummy receiver surface 49 is then removed from the platen 22 and the board feeder unit 21 is activated to feed a receiving surface 23 onto the platen 22.

Receiving surface 23 is then registered to the platen 22 via the pins 24 and 24′ and, dependent upon the size of the receiving surface 23, pins 24″ or 24‴ in the same manner as the master 48 was registered, but without the use of the dummy receiving surface 49. This is accomplished by the outer perimeter alignment pins 24′ of platen 22 raising up to form a right angle corner. During this positioning, the vacuum pump assembly 15 is not activated to permit the receiving surface 23 to be properly positioned. Once properly positioned in the right angle corner, the desired center alignment pins 24″ raise up approximately ¼″ and the perimeter pins 24′ or 24‴ raise up approximately another ½″. The vacuum pump assembly 15 is activated and the receiving surface 23 is pulled down onto the platen 22. Alignment pins 24′ and, if utilized, pins 24″ and 24‴ then retract. The receiving surface 23 is then in position for the master transport assembly 34 to bring the charged and toned master 48 over the receiving surface 23. The master transport assembly 34, with its carrier web means 40 is then properly registered again to the platen 22 by the use of master transport assembly alignment pins 33, in the manner previously described with respect to the registration of the master 48.

A receiving surface 23, such as a copper circuit board that is preferably two-sided and is diagrammatically illustrated in FIG. 2, is placed on the platen 22 of FIG. 1 and is registered so it will be precisely aligned with the master 48 by the alignment pins 24 that are positioned by means of cams 25, or other appropriate apparatus. The alignment pin receptacles 58, seen in FIGS. 2 and 4A, are electrically isolated from the platen 22 by a dielectrically insulating sleeve 67 surrounding the receptacles 58 to isolatethe high voltage charge on the platen 22 from the master transport assembly 34. This high voltage charge is used to electrostatically transfer the developed image from the master 48 to the receiving surface 23, in conjunction with the transfer roller 42. Dielectric standoffs 69, dielectrically insulating sleeves 67 and dielectric cam contact blocks 90, made of an insulating plastic are used to electrically isolate platen 22 from the support frame 11, as is seen in FIG. 2.

The master transport assembly 34, once the receiving surface 23 is properly positioned on platen 22, carries the carrier web means 40 and the master 48 of FIG. 2 toward the platen 22. The master 48, passes over the charging corona 32, which charges the permanent latent image on the master 48, and then passes over the development or toning station 16, which includes reversing roller 30 and development toner electrode 31, to develop the latent image. Toner is fed out of the slots (not shown) in the electrode 31 at an angle to ensure the surface of the development electrode 31 is completely coated during development of the master 48. The toner is pumped from the toner tank assembly 12 of FIG. 1. Reversing roller 30, is driven by a pair of reversing roller drive rollers (not shown) that are reversing roller drive sprockets (not shown), that are in turn driven by a drive motor and drive chains (not shown). One of the two drive sprockets uses a spur gear (not shown) to drive reversing roller 30.

The carrier web backing means or backing plate 41 is held stationary in place over the development station 16 as the master transport assembly 34 is driven through the development cycle. Development or toning station 16 is maintained in the raised position during this time by an eccentrically shaped toning station cam (not shown) that is in a raised position so that the cam forces up against a cam receiving plate (not shown). This cam is rotated between its off-centered raised position and its lowered position by a rotational clutch, a drive chain and a cam drive sprocket (all not shown). Once transfer roller 42 has passed over development electrode 31, depressant corona 29, and the discharge corona 28, bearing stop block 57 strikes a pneumatically driven pin 75 (see FIG. 1) that is mounted to support rail 76. At this time the transfer roller 42 separates from the web backing plate 41.

The separation is effected by the master transport assembly 34 being driven by the master transport assembly drive motor 78 and its associated main drive screw shaft 35 until the stop block 57, with its bearing 39, contact retractable pin 75, which is mounted to the angle iron support rail 76. Transfer roller bearings 56 are driven by transfer roller drive screw rod 36 via drive screw 80 and its associated transfer roller drive bracket 81 until the pivot arm 55 are driven with bearings 56 into contact with stop pins (not shown), mounted to brackets (also not shown) fastened to the transport assembly support members 63. This causes the pivot arms 55, spring loaded by the tensioning springs 43, of FIG. 1, to rotate about pins 54, thereby causing the transfer roller guide means 50 to raise up out of retention grooves 52 of ramp plates 51. Carrier web backing plate 41 and its attached ramp plates 51 are held in place by the contact of stop block 57 with retractable pin 75 as master transport assembly 34 is driven by drive screw shaft 35 and its drive motor 78 toward platen 22 until the master transport assembly's stop bracket 38 contacts the rear of the carrier web backing plate 41. Although there are two transfer roller bearings 56, pivot arms 55, tensioning springs 43, pivot pins 54, retention grooves 52 and ramp plates 51, only one of each are shown in FIGS. 1 and 2 since the FIGURES are side views.

Until this separation the transfer roller 42, with its guide roller 50, remains seated in the retention groove 52 of ramp plate 51. After separation, the transfer roller 42 is held in its raised position by being driven against contact pin (not shown). The entire transfer roller means, which includes the pivot arm 55, transfer roller 42, guide means 50, bearing 56, stop block 57, backing plate 41, ramp plate 51 and bearing 39, is driven along bearing support shaft 37 by transfer roller drive screw rod 36.

The engagement of bearing stop block 57 with retractable pin 75, and the subsequent separation of the transfer roller 42 and the web backing plate 41, causes the web backing plate 41 to keep the carrier web 40 generally flat and a uniform distance from the toning station 16 during the entire development cycle. During the development cycle, excess solvent is removed from the area around the developed image by the reversing roller 30 of FIG. 1, in conjunction with the depressant corona 29. The excessive non-polar insulating solvent removed from around the developed image before transfer is directed into a collection pipe (not shown), which directs it to a central collection tank (not shown). Upon completion of the development cycle, retractable pin 75 is retracted upwardly to allow web backing plate 41 to continue to traverse until it is directly over cleaning station 18.

During this portion of the operation of apparatus 10, the cleaning station 18 of FIG. 1 is in a lowered position so that the cleaning roller 82 does not interfere with the master 48 as it is enroute to the transfer operation. After the image has been transferred to the receiving surface 23, the cleaning station 18 is cammed to a raised position by cam 84, utilizing a rotational clutch (not shown).

Prior to the image transfer, wicking station 19 applies a layer of liquid containing non-polar insulating solvent to the receiving surface 23 of FIG. 2. Gap spacing and charging strips 26 of FIG. 1, preferably about 5 mils thick and formed of Mylar® plastic coated with aluminum on the bottom surface, are placed along opposing sides of the receiving surface 23 by dispensing apparatus (not shown) as the master transport assembly 34 passes over the receiving surface 23 on the platen 22. The gap spacing and charging strips 26 are played out along the two opposing side edges of the receiving surface 23 by a gap spacing strip tensioning spool, a strip dispensing roller and a guide and tensioning roller (all not shown). As the gap spacing strips 26 are fed out, non-polar insulating solvent is applied to the receiving surface 23 (not shown) by spray bar 86, mounted on the wicking station 19. A roller 85 spreads out the solvent to ensure that a uniform layer is applied to the receiving surface 23. A bracket arm mounted to the wicking station side sheet (both not shown), controls the positioning of roller 85. An air knife 87 can also be utilized after image transfer to remove the excess solvent on the receiving surface 23.

The master transport assembly 34 of FIG. 2 stops when the master 48 on the carrier web means 40 is positioned precisely over the conductive receiving surface 23 on the platen 22, so that the master 48 precisely overlies the conductive receiving surface 23. The transfer roller 42 is then lowered into position, so it is ready to perform the transfer operation.

Figure 3:
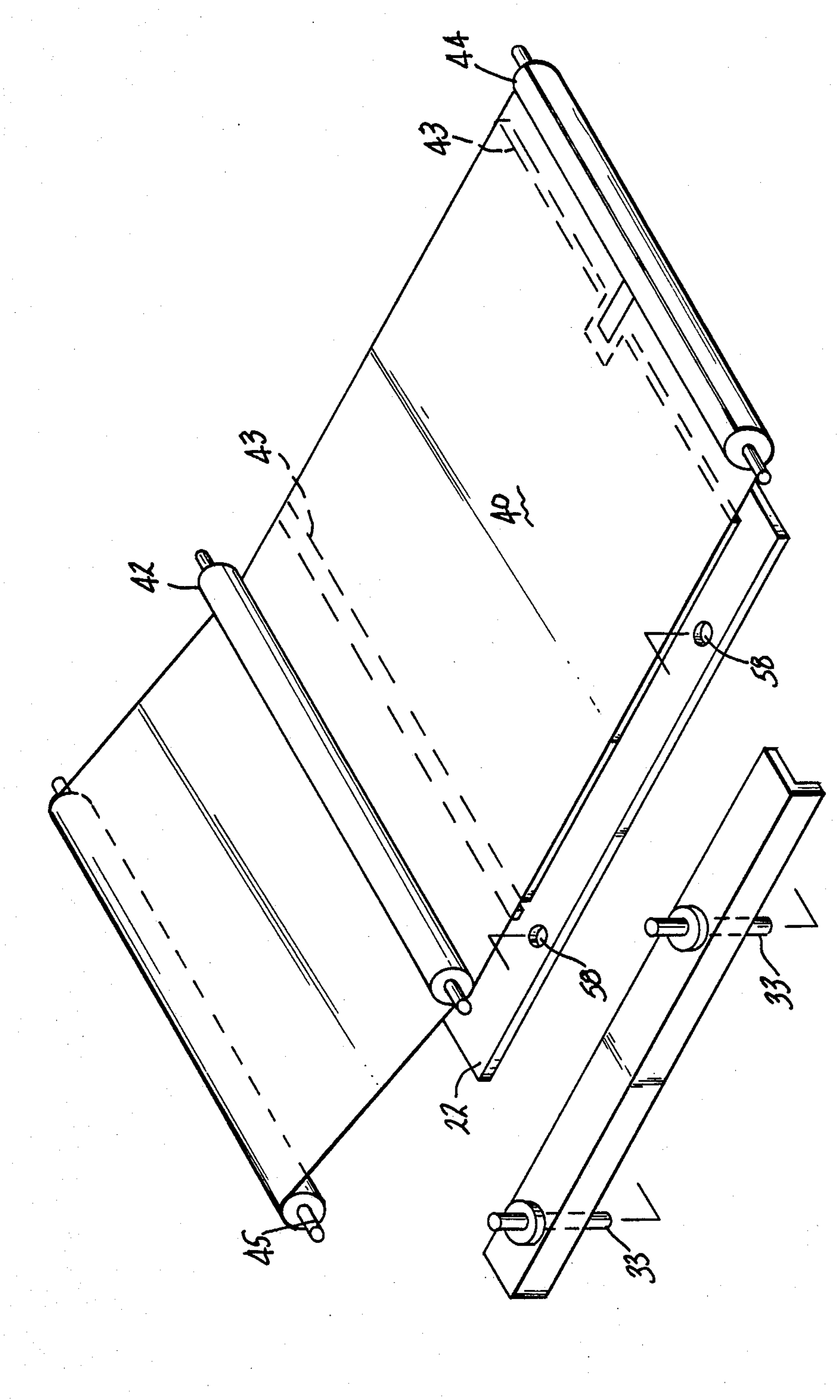
FIG. 3 is a diagrammatic side perspective view of the flexible carrier web as it is positioned with respect to the, master and in exploded fashion showing the master alignment pins.

As best seen in FIGS. 2 and 3, the master transport assembly 34 has electrically grounded web tensioning roller means 45 mounted on an idler arm 46 that is movable by means of the spring 47 to cause the roller means 45 to turn about a suitable support, such as a bearing (not shown), to maintain the proper tension on the carrier web means 40. Once properly positioned, the transfer roller 42 contacts the back or upper side of the carrier web means 40 and traverses a distance equal to at least the length of the master 48 to bring the master adjacent to, but not in contact with, the receiving surface 23 at discrete points along the entire length of the master 48.

Web tensioning roller means 45 of FIGS. 2 and 3 applies the high voltage charge, varying from about 200 to about 3,000 volts, dependent upon the master, to the silver surface of the carrier web means 40 to pick up and retain the master 48 on the carrier web means 40. Web retention roller means 44 is grounded to allow the non-exposed areas on the master to discharge to ground. The carrier web means 40 has an area 43 etched out through the conductive silver coating to the nonconductive material, such as the Mylar® plastic. This area 43 is the dielectric area which provides a conductive break between the high voltage area and the ground area in the carrier web means 40. The high voltage area picks up and holds the master 48 on the carrier web means 40 and the ground area provides a path retention roller means 44 combines with the tensioning roller means 45 and the transfer roller 42 to permit the transfer roller 42 to smooth out the carrier web means 40 and the master 48 to obtain a smooth, continuous surface that is free of ripples.

As is best seen in FIG. 2, the transfer roller 42 establishes with the carrier web means 40 a leading angle and trailing angle. These leading and trailing angles vary as the transfer roller 42 traverses the entire length of the master 48. The leading angle and the trailing angle will vary in angulation depending upon the diameter of the transfer roller, the speed of travel of the transfer roller across the carrier web means 40, the length of the master 48, the size of the transfer gap between the master 48 and the receiving surface 23, and the type of toner used. The leading angle can vary from between about 1° to about 10° from the front at the beginning of contact with the master 48 to about 6° to about 30° at the end of the master 48. Similarly, the trailing angle can vary from between about 45° down to about 22½° at the beginning of contact with the master 48 to about 22½° to about 10° at the end of the master 48. For example, with a 1½ inch diameter transfer roller, a 24 inch long master, a transfer roller traversing speed of about 10 inches per second and about a 5 mil thick transfer gap, the leading angle was about 1° at the beginning of contact with the master 48 and about 6° at the end of the master 48. The trailing angle at these two locations varied between about 22½° to about 12°. As a general guide, it is not desirable to use a larger than necessary angle for the leading and trailing angles.

The transfer roller 42, with the web tensioning roller means 45 and the web retention roller means 44, maintain a uniform tension on the carrier web means 40 to ensure discrete point to point transfer of the developed image on the master to the receiving surface through a transfer window and to avoid entrapping air and excessive non-polar insulating liquid solvent between the two surfaces. The transfer window is the area on the master 48 which the diameter of the transfer roller brings into transfer proximity for discrete point transfer with the receiving surface 23.

The finite gap between the two surfaces can be filled with non-polar insulating solvent across which the toner particles travel.

The electrostatic field between the master 48 and the conductive receiving surface 23 is established by the application of a charge on the receiving surface 23. This charge is supplied by an independent high voltage source (not shown) through the aluminum coating on the gap spacing and charging strips 26 of FIG. 1. This electrostatic field permits the transfer of the developed image on the master 48 to the receiving surface 23.

In operation, a master 48 is placed on the platen 22 and registered. The permanent master 48 has previously had its photosensitive surface exposed to obtain the difference in electrical resistivity required for the process by the cross-linking of the exposed surface area to obtain the permanent latent image desired. This cross-linked exposed surface area has increased electrical resistivity.

A dummy receiving surface or punch guide 49 that is the same thickness as the receiving surface 23 is placed on the platen 22. The master 48 is then placed atop dummy receiving surface 49. The four alignment pins 24 are then raised to register the master 48 and the dummy receiving surface 49 to the platen 22. Once this is properly registered via the pins 24, the vacuum pump apparatus 15 is activated to hold both the dummy receiving surface 49 and the master 48 in place.

The master transport assembly 34 positions the carrier web 40 over the master 48 and the carrier web 40 is registered to the platen 22 and the master 48, with the use of platen pins 24 and alignment pins 33. An electrical charge is applied to the conductive surface of the flexible carrier web 40 to pick up and hold the master 48 in the registered position on the web 40. The master transport assembly 34 then returns the carrier web 40 and the master 48 to the right-most position of FIG. 1 on support frame 11.

The board or conductive receiving surface feed unit 21 then picks up a receiving surface 23 and places it on the platen 22 where it is registered in position via the desired alignment pins 24 and 24, and, depending upon the size of the receiving surface 23, pins 24'' or 24'''. Once properly positioned the master transport assembly 34 begins its traverse along guide rails 17 with the master 48, bringing the master 48 over the charge corona 32 to have the master 48 charged. The master 48 and the carrier web 40 continue traversing to bring the master 48 over the development station 16, with its development electrode 31. The master 48 remains positioned over the development electrode 31 as the transfer roller means has transfer roller 42 separate from the retention groove 52 at the top of ramp plate 51 after stop block 57 contacts retractable pin 75. The master transport assembly 34 continues to transport the master 48 over the reversing roller 30 and depressant corona 29.

The disengagement of the transfer roller 42 from the retention groove 52 allows the web backing plate 41 to be driven in the opposite direction against stop bracket 38. This is accomplished by actuating the retractable stop pin 75, mounted to the support bracket 76, in front of stop block 57 as the master transport assembly 34 is driven towards the platen 22 of FIG. 1 by the main drive screw shaft 35. After the web backing plate 41 abuts stop bracket 38, the retractable stop pin 75 is retracted to a raised position and a rotational clutch is disengaged and permits the toning station 16 to pivot downwardly about a shaft to a lowered position (not shown). The web backing plate 41 is now in the transfer position. The transfer roller 42 is then in position to traverse the carrier web means 40 to effect the electrostatic transfer from the master 48 to the receiving surface 23.

The receiving surface 23 is wicked by wicking station 19, applying non-polar insulating solvent to it from spray bar 86, as the gap spacing strips 26 are fed out along its opposing edges. A charge is then applied to the receiving surface 23, and the developed image on the permanent master 48 and the receiving surface 23 are then ready for image transfer utilizing the transfer roller 42.

The transfer roller 42 traverses the entire length of the master 48 by being driven along bearing support shafts 37 of FIG. 2 by a transfer roller drive motor 79, turning transfer roller drive screw rod 36, which drives screw 80 and its associated transfer roller drive bracket 81. Once the transfer roller 42 has traversed this entire length, guide roller 50 rides up the ramp plate 51 into the retention groove 52 as the bearing stop block 39 engages the stop bracket 38. The ramp plate 51 is suitable connected to carrier backing means or web backing plate 41. This positioning of the guide roller 50 continues until the entire master transport assembly 34 is moved back to the start position seen in FIG. 1. The riding of the guide rollers 50 up the ramp plate 51 cause the pivot arms 55, connected to bearing 56 to pivot about pins 54 to raise the transfer roller 42 up and allow the carrier web means 40 to be flat against the web backing plate 41.

Once the transfer operation has been completed the master cleaning station 18 of FIG. 3 is cammed up to its raised position by the aforementioned cam 84 to permit the master 48 to be cleaned prior to the next image transfer. Cleaning station 18 is then raised against carrier web 40, which is in contact with web backing plate 41. Cleaning station 18 employs a cleaning roller 82 and a spray bar (not shown) to apply a coating of solvent to the master 48 and then remove any excess. A web wiper (not shown) may also be used to clean the master 48 as part of the cleaning station 18 after image transfer has occurred.

Web backing plate 41 and the carried transfer roller 42 are held over the cleaning station 18 during the entire cleaning cycle by the drive motor 78 turning transfer roller drive screw rod 36 to drive the transfer roller 42 and web backing plate 41 towards stop plate 88 of FIG. 1 as master transport assembly 34 is driven at the same speed in the opposite direction to its starting position against master transport assembly stop plate 89 of FIG. 2. The master 48 is discharged by discharge corona 28 prior to the master transport assembly 34 returning to its starting position. The imaged receiving surface 23 is then removed by pickup apparatus 20 and platen 22 is ready for receipt of another receiving surface 23 from feeder unit 21.

The use of the term permanent latent image with respect to the master 48 is intended to connote that the image is durable, lasting over a long period of time, as well as not changing in the high quality and resolution of its transferred image. For example, the permanent latent image can last months and, perhaps, years once exposed into the electrostatically imageable surface of the master 48, under proper storage conditions. Additionally, as many as 5,000 images have been transferred from a single master.

While the preferred structure in which the principles of the present invention have been incorporated is shown and described above, it is to be understood that the invention is not to be limited to the particular details thus presented but, in fact, widely different means may be employed in the practice of the broader aspects of this invention. For example, the master of the electrostatically developable surface can also include zinc oxide, cadmium sulfide, selenium or suitable organic photoconductors. The carrier web could also be made from a flexible photoconductor or the photosensitive material used as the master with the permanent latent image could be included in the carrier web. The registration method and apparatus is equally well employable with conductive or nonconductive receiving surfaces. The scope of the appended claims is intended to encompass all obvious changes in the details, materials and arrangements of parts that will occur to one of ordinary skill int the art upon a reading of this disclosure.

What is claimed is:

1. A method of registering a flexible web to a rigid support station, the flexible web being usable to accurately and repeatably transfer a developed image to a receiving surface, the receiving surface being supported by the rigid support station, comprising the steps of:

(a) placing a master on the rigid support station;

(b) aligning the master in a fixed position on the rigid support station;

(c) securing the aligned master in the fixed position on the rigid support station;

(d) moving the flexible web to a position opposite the secured master;

(e) aligning the flexible web with the secured master;

(f) registering and securing the flexible web with the secured master and the rigid support station;

(g) taking the aligned master from the rigid support station and securely placing it onto the registered flexible web; and (h) removing the flexible web with the master attached from opposite the rigid support station.

2. The method according to claim 1 further comprising:

(a) placing a receiving surface on the rigid support station;

(b) aligning the receiving surface in a fixed position on the rigid support station;

(c) securing the aligned receiving surface in the fixed position on the rigid support station;

(d) moving the flexible web with the attached master to a position opposite the secured receiving surface;

(e) aligning the flexible web with the secured receiving surface; and (f) registering and securing the flexible web with the master attached to the secured receiving station.

3. The method according to claim 2 further comprising developing the master to have a transferable developed image thereon.

4. The method according to claim 3 further comprising transferring the developed image to the receiving surface.

5. The method according to claim 1 further comprising aligning the master in the fixed position by using retractable pins to engage and retain the master.

6. The method according to claim 5 further comprising securing the aligned master in the fixed position by using a vacuum to retain the master.

7. The method according to claim 6 further comprising using retractable alignment pins to register and secure the flexible web with the secured master.

8. The method according to claim 7 further comprising aligning the receiving surface in a fixed position on the rigid support station by using retractable pins to engage and retain the master.

9. The method according to claim 8 further comprising securing the aligned receiving surface in the fixed position by using a vacuum to retain it.

10. The method according to claim 9 further comprising using the same retractable alignment pins which were used to register and secure the flexible web with the secured master to register and secure the flexible web and the attached master with the secured receiving surface.

11. Apparatus for accurately and repeatedly registering a flexible carrier means to a receiving surface support, the flexible carrier means holding a master that has a latent image which is developed and electrostatically transferred to a receiving surface placed on the receiving surface support, comprising in combination:

(a) a support frame;

(b) transport means moveably mounted to the frame and having the flexible carrier means mounted thereto, the transport means being moveable in a first direction from a first position to a second position opposite the receiving surface support and moveable in an opposing second direction to return to the first position;

(c) a master with a permanent latent image held in a fixed position on the flexible carrier means;

(d) charging means mounted to the frame and operative to charge the latent image on the master when the transport means moves the flexible carrier means in the first direction;

(e) developing means mounted to the frame and operative to develop the latent image on the master when the transport means moves the flexible carrier means in the first direction;

(f) transfer means contactable with the flexible carrier means when the transport means is in the second position to traverse the flexible carrier means at least where the master is held in the fixed position to effect the transfer of the developed image to the receiving surface;

(g) alignment means connected to the transport means and cooperative with the receiving surface support to repeatedly fix the transport means and flexible connect means with the master in the same position opposite the receiving surface support when the transport means has moved to the second position;

(h) receiving surface support alignment means selectively actuatable to repeatedly and accurately position a receiving surface on the receiving surface support prior to movement of the transport means to the second position;

(i) cleaning means mounted to the frame to clean the master after the transfer of the developed image as the transport means moves the flexible carrier means and the master in the opposing second direction to the first position; and (j) drive means effective to drive the transport means in the first direction and the opposing second direction and drive the transfer means as it traverses the flexible carrier means.

12. The apparatus according to claim 11 wherein the receiving surface support alignment means further comprise a plurality of retractable alignment pins that extend through the receiving surface support.

13. The apparatus according to claim 12 wherein the plurality of retractable alignment pins are variably selectable to position receiving surfaces of variable widths and lengths.

14. The apparatus according to claim 12 wherein the alignment means connected to the transport means are retractable pins that are retracted when the transport means is in the first position and during movement in the first direction and opposing second direction, but are extended when the transport means is in the second position opposite the receiving surface support.

15. The apparatus according to claim 14 wherein the master is electrostatically held in place on the flexible carrier means.

16. The apparatus according to claim 15 wherein the transport means is mounted to the support frame through thrust bearings that permit controlled movement of the transport means with respect to the receiving surface platen when the transport means is in the second position.

17. The apparatus according to claim 16 wherein the receiving support surface has a generally planar platen top surface with a plurality of vacuum holes therein.

18. The apparatus according to claim 17 wherein a vacuum system is connected to the receiving support surface and is activated to hold the receiving surface in place after the receiving surface is aligned by the receiving surface support alignment pins.

19. The apparatus according to claim 11 wherein the flexible carrier means is a web that is held in tension by a retention roller and a tensioning roller, the retention roller and tensioning roller being mounted to the transport means.

20. The apparatus according to claim 18 wherein at least a portion of the receiving surface support alignment pins are extended and retracted by means of eccentric cams.

21. The apparatus according to claim 20 wherein the retractable pins connected to the transport means are pneumatically extended and retracted.

22. Apparatus for accurately and repeatedly registering a flexible carrier means to a receiving surface support, the flexible carrier means taking and retaining in a fixed position a master from the receiving surface support, comprising in combination:

(a) a support frame;

(b) transport means moveably mounted to the frame and having the flexible carrier means mounted thereto, the transport means being movable in a first direction from a first position to a second position opposite the receiving surface support and moveable in an opposing second direction to return to the first position;

(c) a master of predetermined length with a permanent image positionable on the receiving surface support;

(d) receiving surface support alignment means selectively actuatable to accurately and repeatedly position the master on the receiving support surface;

(e) alignment means connected to the transport means and cooperative with the receiving surface support to repeatedly fix the transport means and the flexible carrier means in the same position opposite the receiving surface support and the master when the transport means has moved to the second position; and (f) drive means effective to drive the transport means in the first direction and the opposing second direction.

23. The apparatus according to claim 22 wherein the transport means further comrpises a transfer means moveably mounted thereto and contactable with the flexible carrier means when the transport means is in the second position to traverse the flexible carrier means to bring the flexible carrier means and the master into discrete point contact along the predetermined length of the master to effect the electrostatic pickup and retention of the master on the flexible carrier means.

24. The apparatus according to claim 23 wherein the receiving surface support alignment means further comprise a plurality of retractable alignment pins that extend through the receiving surface support.

25. The apparatus according to claim 24 wherein the alignment means connected to the transport means are retractable pins that are retracted when the transport means is in the first position and during movement in the first direction and opposing second direction, but are extended when the transport means is in the second position opposite the receiving surface support.

26. The apparatus according to claim 25 wherein the alignment means connected to the transport means are pneumatically extended and retracted.

27. The apparatus according to claim 26 wherein the receiving support surface has a generally planar platen top surface with a plurality of vacuum holes therein.

28. The apparatus according to claim 27 wherein a vacuum system is connected to the receiving surface and is activated to hold the master in place after the master is aligned by the receiving surface support alignment pins.

* * * * *